(No Model.)
J. WALTER.
FERTILIZER DISTRIBUTER AND MIXER.
No. 423,645. Patented Mar. 18, 1890.
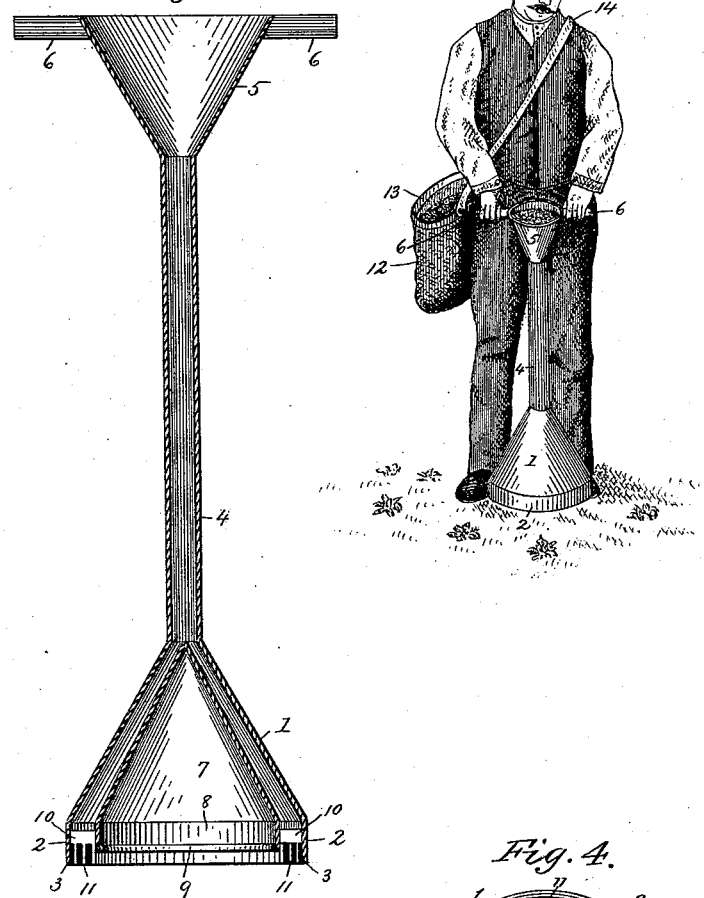
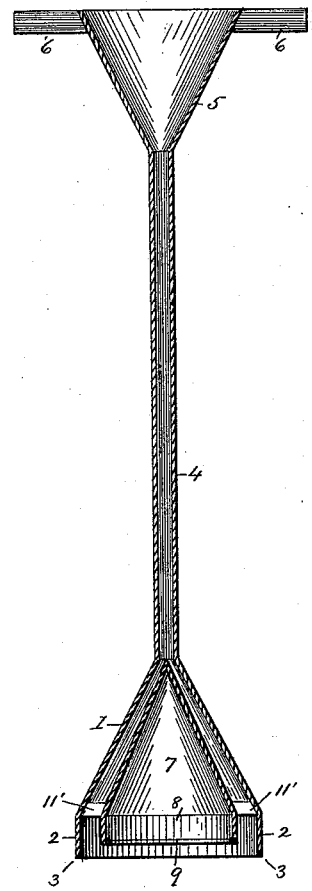
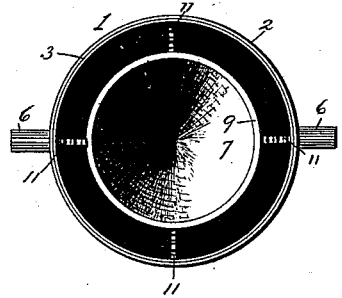
Witnesses
T. R. Stuart
Parker H. Sweet Jr.
Inventor:
John Walter.
By Marble & Mason,
Attorneys.

UNITED STATES PATENT OFFICE.

JOHN WALTER, OF WINTER HAVEN, ASSIGNOR OF ONE-HALF TO RICHARD R. FOOTE, OF AUBURNDALE, FLORIDA.

FERTILIZER DISTRIBUTER AND MIXER.

SPECIFICATION forming part of Letters Patent No. 423,645, dated March 18, 1890.

Application filed December 9, 1889. Serial No. 333,012. (No model.)

*To all whom it may concern:*

Be it known that I, JOHN WALTER, a citizen of the United States, residing at Winter Haven, in the county of Polk and State of Florida, have invented certain new and useful Improvements in Fertilizer Distributers, Mixers, Cultivators, &c.; and I do hereby declare the following to be a full, clear, and exact description of the invention, such as will enable others skilled in the art to which it appertains to make and use the same.

My invention relates to a combined fertilizer distributer, mixer, and cultivator for plants and vines, which also acts as a protector therefor and is capable of being employed as a seed-dropper; and it consists in the peculiar construction and arrangement or combination of parts hereinafter disclosed in the description, drawings, and claims.

The objects of my invention are, first, to provide an implement of the character named which will distribute fertilizing materials around plants or vines, mix the same with the soil, and work or cultivate said plants or vines at one and the same time or operation, which will protect said plants or vines from contact with and injury from the fertilizer while being distributed, which will operate as a seed-dropper and protect the seed from being scattered or blown away by the wind, and also protect the fertilizer in the same manner, which will distribute and mix fertilizing materials in hills previous to dropping seed and setting out plants or vines, which will be easy to operate while standing or without stooping, and which will clear the ground of weeds and the like surrounding said plants or vines; and, second, to provide an implement of this character which is especially adapted for cultivating and fertilizing all kinds of plants, vines, and seed that are planted in hills—such as those for raising or growing cabbage, tomatoes, cucumbers, corn, potatoes, water-melons, and strawberries—and which is durable, easy to operate, and inexpensive to manufacture. These objects I accomplish by the peculiarly-constructed implement illustrated in the accompanying drawings, forming part of this specification, in which the same reference-numerals indicate the same or corresponding parts, and in which—

Figure 1 is a perspective view of my improved combined fertilizer distributer, mixer, and cultivator in position for use; Fig. 2, a detail vertical sectional view of the same; Fig. 3, a similar view, on a smaller scale, with the rakes omitted; and Fig. 4, a bottom end view of the device shown in Figs. 1 and 2.

Referring to the drawings, the numeral 1 indicates the outer cone, which is truncated and forms the casing of the implement, its lower end or base being provided with a vertical annular band 2, made of iron or steel and having a sharp or knife edge 3 at its lower end, which cuts its way into the soil and prevents the device from slipping or sliding out of place while being operated, and also prevents the fertilizer from being thrown out or escaping while being mixed with the soil by the rakes, hereinafter described. To the upper end or truncated portion of this cone is secured a feed-pipe 4, which is connected at its upper end to the hopper 5, which is of the form of an inverted truncated cone, and which receives the fertilizer to be distributed and mixed from the hand of the operator. To the opposite sides of this hopper are secured the projecting handles 6, which enable the operator to impart rotary reciprocating movement to the implement.

Within the outer cone 1 is arranged and secured another or inner cone 7, which conveys the fertilizer, when introduced and passed through the hopper 5 and the feed-pipe 4, down and around the plant or vine, and distributes the same in the circular space between its lower end and that of the outer cone. This inner cone is provided with an apex, which may be either round or pointed, and is centered exactly within the feed-pipe 4; also, at its lower end or base it is provided with a vertical annular band 8, having a wired or beaded lower edge 9, for preventing the cutting or injuring of the roots and branches of the plants or vines when undergoing fertilization or cultivation. The lower end of this inner cone, or its vertical annular band 8, terminates a short distance above the lower end of the outer cone or its vertical annular band 2, also, this inner cone covers the plants or vines and protects them from coming in contact with the fertilizing material, which is injurious to the foliage and tender branches thereof.

Intermediate of the annular bands 2 and 8, at the lower ends of the cones, and secured thereto by solder or other suitable means, is arranged a suitable number of rakes 10, which connect the two cones together and support the inner one, which are formed of rectangularly-shaped plates having teeth 11, and which terminate a short distance below the inner band 8 and on a line with the knife-edge 3 of the outer band 2. The outer teeth of said rakes are arranged slightly inward from the inner surface of the annular band 2, so as to not interfere with said knife-edge in cutting its way into the ground. As thus constructed and arranged, when said knife-edge and the points of the rake-teeth are forced downward by light pressure and the implement is reciprocated, the rakes will be caused to thoroughly mix the fertilizer with the soil in a circle around the plants, and at the same time remove weeds and the like and work or cultivate the plants. This form or construction of my implement, as shown in Figs. 1, 2, and 4, is also capable of use for working or cultivating plants without distributing and mixing fertilizing material, and also it is employed for distributing fertilizing materials and mixing the same with the soil in hills which have been prepared previously to the setting of plants or planting of seed therein.

The other form of my implement has the same construction as that shown in Figs. 2 and 4, only it contains no rakes, is much smaller than the one illustrated in the other figures of the drawings, and its inner cone is supported within the outer one by the inclined braces 11', which are soldered or otherwise suitably secured at their ends to the walls of said inner and outer cones.

This implement is used for the planting or dropping of seed in the centers or tops of previously-formed hills, either before or after the fertilizer has been distributed and mixed with the soil in circles around the tops of said hills, the seed being dropped in small circles of a diameter equal to the size of the space between the inner and outer cones and equally distributed without being disturbed or wasted in the slightest degree by the wind, as would follow were they simply scattered upon the surface of the ground without the protection of the outer cone.

The objects of planting or dropping the seed at the tops of the hills and at the centers of the circles formed in the soil and mixed with the fertilizer by the rakes are, first, to prevent the fertilizer from coming into direct contact with the seed, which would be injurious to the latter, and, second, to cause the roots of the plants when growing to spread outward in all directions in search of nourishment from the surrounding fertilizer. The plants thus not only grow stronger and larger, but live longer and become more productive than those raised or grown by the old method, in which the fertilizer has been usually placed in the bottoms of the hills and the seed in or near the tops thereof, resulting in the roots growing downward, becoming enlarged and bunched, and absorbing a too great part of the nourishment which should go to the plants, thus rendering them less productive than is desirable.

In the use of my implement the fertilizer or seed is carried in a sack 12, made for the purpose and provided with a wire or other light metal band 13 in its mouth, and with a strap 14 for suspending the same from the shoulder and under the arm of the operator, as shown in Fig. 1. In thus carrying the material it is not tiresome, and the hand of the operator soon becomes perfect in gaging the necessary amount to be supplied to the hopper, and also it does not interfere in the slightest with the free use of the arms in reciprocating the implements by their handles.

The operation of my combined fertilizer distributer, mixer, and cultivator is very simple, as it is only necessary to place the same over or around the plant or vine, then impart thereto a slight downward pressure, so as to seat the same in the soil, then feed the fertilizer into the hopper and through the feed-pipe by hand, and then reciprocate the same by the handles on the sides of the hopper, which can all be done without stooping or material fatigue to the operator. During this operation not only is the fertilizer uniformly distributed around the plant or vine and mixed with the soil by the rakes, but the plant or vine is cultivated or worked, the weeds and the like being also removed from around the same and the fertilizing material prevented from coming in contact with said plant or vine and from being blown away or wasted by the wind; also, this form of my implement, as stated, is capable of use for working or cultivating plants or vines without fertilizing the same at the same time, and also of distributing the fertilizer and mixing the same with the soil around hills which have been previously prepared for the setting out of plants or the planting of seed.

The manner of operating the other form of my invention, or the one which is used as a seed-dropper, is the same as that of my other implement just described, and it is principally employed, as stated, for the planting or dropping of seed in the centers or tops of hills either before or after the fertilizer has been deposited and mixed with the soil in a circle around the tops of said hills or outside of the space for the seed, which space is a small circle having a diameter equal to the space between the inner and outer cones, in which the seed are equally distributed or dropped without being blown about or scattered by the wind.

Having thus fully described the construction and arrangement or combination of the parts of my invention, with its advantages and operation, what I claim as new is—

1. The herein-described implement provided with a hopper having two oppositely-arranged handles on its sides, by which rotary reciprocating motion may be imparted to said implement, a feed-pipe, and outer and inner cones having open lower ends communicating therewith and arranged to leave a space intermediate of their walls for the delivery of material, substantially as described.

2. The herein-described implement provided with a hopper having two oppositely-arranged handles on its sides, by which rotary reciprocating motion may be imparted to said implement, a feed-pipe, and outer and inner cones having open lower ends, the latter being provided with a vertical annular band at its lower end having an enlarged edge, said cones being arranged to communicate with said hopper and feed-pipe and to leave a space intermediate of their walls for the delivery of material, substantially as described.

3. The herein-described implement provided with a hopper having handles on its sides, a feed-pipe, and an outer and inner cone, the former being provided with a vertical annular band at its lower end having a knife-edge, said cones being arranged to communicate with said hopper and feed-pipe and to leave a space intermediate of their walls for the delivery of material, substantially as described.

4. The herein-described implement provided with a hopper having handles on its sides, a feed-pipe, and an outer and inner cone respectively provided at their lower ends with vertical annular bands having, respectively, a knife-edge and an enlarged edge, said cones being arranged to communicate with said hopper and feed-pipe and to leave a space intermediate of their walls for the delivery of material, substantially as described.

5. In a combined fertilizer distributer and mixer and cultivator for plants and vines, the combination, with the hopper having the handles and the feed-pipe, of the outer and inner cones communicating therewith and provided with rakes intermediate of their lower ends, substantially as and for the purpose described.

6. In a combined fertilizer distributer and mixer and cultivator for plants and vines, the combination, with the hopper having the handles and the feed-pipe, of the outer and inner cones respectively provided at their lower ends with vertical annular bands having, respectively, a knife-edge and an enlarged edge, said cones being arranged to communicate with said hopper and feed-pipe and to leave a space intermediate of their walls for the delivery of material, substantially as described.

7. In a combined fertilizer distributer and mixer and cultivator for plants and vines, the combination, with the hopper having the handles and the feed-pipe, of the outer and inner cones communicating therewith and provided with vertical annular bands having, respectively, a knife-edge and an enlarged edge, the latter terminating a short distance above said knife-edge, substantially as and for the purpose described.

8. In a combined fertilizer distributer and mixer and cultivator for plants and vines, the combination, with the hopper having the handles and the feed-pipe, of the outer and inner cones communicating therewith and provided with vertical annular bands having, respectively, a knife-edge and an enlarged edge, the latter terminating a short distance above said knife-edge, and rakes secured between said vertical annular bands, substantially as and for the purpose described.

9. In a combined fertilizer distributer and mixer and cultivator for plants and vines, the combination, with the hopper having the handles and the feed-pipe, of the outer and inner cones communicating therewith and provided with vertical annular bands having, respectively, a knife-edge and an enlarged edge, the latter terminating a short distance above said knife-edge, and rakes secured between said vertical annular bands and having their teeth projecting below said enlarged edge and arranged on a line with said knife-edge, substantially as and for the purpose described.

JOHN WALTER.

Witnesses:
CLARA WEBB,
ANTHONY WALTER.